United States Patent
Munro (10) Patent No.: US 7,396,147 B2
(45) Date of Patent: Jul. 8, 2008

(54) BACK-ILLUMINATED PANEL WITH ULTRAVIOLET PROTECTION

(75) Inventor: Alastair Munro, Glasgow (GB)

(73) Assignee: John McGavigan Limited, Glasgow (GB)

(*) Notice: Subject to any disclaimer, the term of this patent is extended or adjusted under 35 U.S.C. 154(b) by 0 days.

(21) Appl. No.: 10/388,323

(22) Filed: Mar. 13, 2003

(65) Prior Publication Data

US 2004/0021961 A1 Feb. 5, 2004

(30) Foreign Application Priority Data

Mar. 13, 2002 (GB) ................. 0205929.3

(51) Int. Cl.
*G09F 13/00* (2006.01)
(52) U.S. Cl. ............... 362/351; 362/509; 362/311; 362/355; 40/443
(58) Field of Classification Search ........ 362/459, 362/487, 494, 509, 516, 540, 135, 257, 296, 362/310, 311, 351, 355; 40/427, 442, 443, 40/444, 446, 453, 219, 205, 200, 204; 359/838, 359/839, 842, 884
See application file for complete search history.

(56) References Cited

U.S. PATENT DOCUMENTS

| | | | | |
|---|---|---|---|---|
| 1,777,866 A * | 10/1930 | Steiss | ........................ | 40/453 |
| 2,221,888 A * | 11/1940 | White | ........................ | 40/437 |
| 2,595,331 A * | 5/1952 | Calihan et al. | ............... | 359/838 |
| 3,487,206 A * | 12/1969 | Dawson et al. | ............... | 362/509 |
| 3,499,240 A * | 3/1970 | Cotton, Jr. et al. | ............ | 40/443 |
| 3,786,237 A * | 1/1974 | Postal | ........................ | 235/491 |
| 4,630,904 A * | 12/1986 | Pastore | ........................ | 362/494 |
| 4,821,019 A | 4/1989 | Taylor | | |
| 4,902,557 A * | 2/1990 | Rohrbacher | ................. | 428/215 |
| 5,005,873 A * | 4/1991 | West | ............................. | 283/92 |
| 5,124,845 A | 6/1992 | Shimojo | | |
| 5,210,967 A * | 5/1993 | Brown | ........................ | 40/219 |
| 5,481,409 A * | 1/1996 | Roberts | ........................ | 359/839 |
| 5,518,786 A * | 5/1996 | Johnson et al. | ............ | 428/40.6 |
| 5,522,623 A * | 6/1996 | Soules et al. | ................. | 283/91 |
| 5,788,357 A * | 8/1998 | Muth et al. | ................. | 362/494 |
| 5,984,496 A | 11/1999 | Malcomson | | |
| 6,158,156 A * | 12/2000 | Patrick | ........................ | 40/443 |

FOREIGN PATENT DOCUMENTS

EP 0 952 388 10/1999

(Continued)

OTHER PUBLICATIONS

Search Report for British Priority Appl. No. GB 0205929.3 (Date of Search—Jan. 23, 2003).

(Continued)

*Primary Examiner*—Ismael Negron
(74) *Attorney, Agent, or Firm*—Alston & Bird LLP (57) ABSTRACT

An automotive vehicle component such as a side mirror comprising a panel having an obverse side and a reverse side, wherein, in use, when viewed from the obverse side the panel has a first appearance when not illuminated from the reverse side, but has a second appearance when illuminated from the reverse side, and further, wherein means are provided for reducing effects upon the panel caused by exposure to ultraviolet radiation.

67 Claims, 8 Drawing Sheets

FOREIGN PATENT DOCUMENTS

| | | |
|---|---|---|
| GB | 2 205 190 | 11/1988 |
| JP | 11 15392 | 1/1999 |
| WO | WO-90/13105 | 11/1990 |
| WO | WO-97/16812 | 5/1997 |
| WO | WO-00/17900 | 3/2000 |

OTHER PUBLICATIONS

Copy of Search Report for corresponding European Appl. No. EP 03 25 1523 Completed Oct. 6, 2004.

* cited by examiner

Coatings onto substrate

Fig.12

Coatings onto ink

Fig.18

BACK-ILLUMINATED PANEL WITH ULTRAVIOLET PROTECTION

FIELD OF INVENTION

The present invention relates to a panel, and to use thereof as a molding, cover or fascia, particularly though not exclusively for an automotive vehicle, e.g., an automotive vehicle exterior part, the panel being capable of being back illuminated.

BACKGROUND TO INVENTION

There is a need in the automotive industry for provision of a colored product which can be back illuminated. Such a product is required to have one appearance when not back illuminated, and another, different appearance when back illuminated.

For example, the one appearance when not back illuminated may color match or be color coded to at least one other part of an automotive vehicle, while the another appearance may display at least one light of the automotive vehicle, such as a turn signal or direction indicator, parking light, side light, headlamp, foglamp or reversing light.

It is an object of at least one embodiment of at least one aspect of the present invention to provide a component, particularly an external component of an automotive vehicle, such as a side mirror or wing mirror or alternatively a bumper, light unit or light cluster, which when not back illuminated has a first, opaque appearance which may be color coded to the automotive vehicle and which when back lit illuminates in a conventional fashion.

It is also an object of the present invention to provide such an external component which is resistant to effects of ultraviolet radiation.

SUMMARY OF INVENTION

According to a first aspect of the present invention there is provided an automotive component having a formed panel, the panel having an obverse side and a reverse side, wherein, in use, when viewed from the obverse side the panel has a first appearance when not illuminated from the reverse side, and has a second appearance when illuminated from the reverse side, and wherein further means are provided for reducing effects upon at least part of the panel caused by exposure to ultraviolet radiation.

Preferably the component comprises at least part of an external automotive vehicle component.

Preferably the panel comprises a formed/shaped/contoured panel.

Preferably the component comprises a side mirror, e.g., including a turn signal or direction indicator, or alternatively a bumper, a light closure or cluster or part of any of such.

The panel may comprise a substrate layer, at least one ink layer and an ultraviolet reducing layer.

The substrate layer may comprise a polycarbonate material and the at least one ink layer may comprise a polycarbonate based ink.

The substrate layer may provide a light diffusing means which may be translucent or transparent in the second appearance.

The ultraviolet reducing means may comprise polyvinyldifluoride or a material based thereon.

According to a second aspect of the present invention there is provided a formed panel adapted for use in the automotive component of the first aspect of the present invention.

According to a third aspect of the present invention there is provided a panel having an obverse side and a reverse side, wherein, in use, when viewed from the obverse side the panel has a first appearance when not illuminated from the reverse side, but has a second appearance when illuminated from the reverse side, and further, wherein means are provided for reducing effects upon the panel caused by exposure to ultraviolet radiation.

Such effects caused by ultraviolet radiation can be fading or bleaching of color, embrittlement of the panel, particularly if comprised of plastic material, cracking and the like. These effects are considered to be deleterious or unwanted and reduction thereof is desirable.

The means for reducing the effects of ultraviolet light exposure can be provided in the form of a coating. This coating may be applied to at least a portion of the panel.

Preferably the coating is applied to at least part of an outermost surface of the panel which preferably is a surface of the obverse side.

A coating substance found to be particularly beneficial comprises polyvinyldifluoride or a material based thereon.

Typically the coating has a thickness of at least about 25 µm.

The panel may be made from a polymer material such as a transparent/translucent polymer film. Preferably polycarbonate is used but other useful polymers include acrylic polyester or other similar thermoplastic materials.

The thickness of the film is typically about 250 µm to about 500 µm.

The panel may be a decorative panel. The panel may comprise a plurality of layers, said layers including a first layer which is an at least partially transparent layer, and a second layer, at least selected areas of said second layer having a degree of contrast in opacity and/or color, said first and second layers being associated with a substrate layer having an obverse surface and a reverse surface, wherein means are provided for furnishing said substrate layer with a partially transparent tinted appearance, wherein said first layer comprises a coating comprising a transparent carrier in which are supported non-opaque particulate light-splitting or light-frequency modifying materials, said materials being capable of causing light-splitting effects when viewed in light falling in the direction of the obverse surface of said substrate layer, and wherein said second layer provides said at least selected areas rearwardly of said first layer which are of predetermined size and shape, the construction and arrangement being such that the light-splitting or modifying effects caused by said particulate material in said first layer and visible in ambient light is suppressed by the passage of light from a source located at the reverse side of the panel so that the presence of said at least selected areas become visible from the obverse side of the panel.

Advantageously, a suitable first layer may comprise an at least substantially transparent carrier containing particulate semi-transparent color producing material. A suitable material may be a flaked, iridescent material of the kind exemplified by mica. Mica flakes may be pre-coated with ultra-thin layers of pigment, for example, oxides of metals such as titanium or iron.

Advantageously, the visual effect of the presence of the pigment may be varied according to the thickness of the pre-coating. Variations may also be observed in accordance with the base color of the substrate layer and the degree of translucency thereof.

Advantageously, said second layer may be provided as graphics in the form of information symbols applied in a discontinuous layer of an opaque or substantially opaque pigment. Conveniently said pigmented material may be printed pigmented ink or the like.

Alternatively said second layer may be color tinted in a contrasting hue so that the color tint is visible only on the passage of light from a source located at a reverse side of the panel.

According to a fourth aspect of the present invention there is provided a panel such as a decorative panel comprising a substrate layer and a coating layer applied to an obverse surface of the layer, said coating comprising non-opaque particulate light-frequency modifying materials entrained in a carrier therefor, said particulate-materials being capable of causing light splitting effects when viewed in light falling upon the coated obverse surface, wherein said substrate layer is non-opaque except where provided with a layer comprising opaque or substantially opaque areas which are of predetermined size and shape, the construction and arrangement being such that the light-splitting or modifying effect caused by the particulate material and visible in ambient light is suppressed by the passage of light from a source located at the reverse side of the panel so that the presence of the opaque areas become visible from the obverse side of the panel, the panel further comprising means for reducing effects upon the panel caused by exposure to ultraviolet radiation.

In examples of panels according to the invention and their use, the panels may be comprised of a partially-transparent panel substrate which is of the kind referred to as smoke-colored. The color may, if preferred, be imparted to the panel in a third layer which may be applied by a printing technique, such as screen printing, but, if preferred, may be obtained by the inclusion of pigment in the plastics film or other material of the panel substrate. It may be found that high quality visual effects are obtained with the use of pigments of a relatively dark hue.

The first layer may be provided by coating the substrate with a layer including ultra-thin flakes of mica that in the present examples have been pre-coated with titanium dioxide. The coated flakes are capable of splitting light into its visible component colors, the apparent color depending upon the thickness of the titanium dioxide layer on the mica. This varies in the present examples from 40 to 160 nm giving a range of color from silver-white through copper-red, lilac, vivid blue, turquoise and finally green, the color sequence being repeated if additional thickness is imparted to the titanium dioxide layer.

It should be noted that in addition to the effect described above, color changes may be seen according to the angle from which the coated mica flakes are observed, the so-called interference color being visible only at the glancing angle. Colors seen at the other angles will differ. For example, if a blue "interference" layer of pigmented material forms a coating on a white background, then the light reflected at the glancing angle is blue and masks the complementary color, yellow, which is seen at other angles. On a colored background, the transparency of the coating permits the background color to be visible through the coating, but at the glancing angle the interference color predominates. On a curved panel, both color effects may be observed at the same time on differing areas of the panel to give a pleasing or aesthetic effect.

In a panel in accordance with the invention, the positioning of a light source behind the panel will allow light from that source to penetrate the panel and the pigmented coating of the first layer. Because the light from behind the panel is of a greater intensity than ambient light falling on the obverse surface of the panel, the color effect visible in the first layer will be suppressed and the colors of the second layer will predominate as the panel "lights up". The provision of graphics if present in the second layer will permit symbols or the like to be visible as dark or darker areas against the back-lit panel.

The invention still further provides a panel assembly adapted to provide a variable visual appearance to a decorative panel constructed in accordance with the third or fourth aspects of the present invention, said assembly further comprising a support device mounting said panel, and a source of light positioned behind the reverse surface of the panel and adapted to provide light arranged to pass through the panel, e.g., substrate and said layers, wherever the opacity thereof permits.

According to a fifth aspect of the present invention there is provided a shaped or moulded member or body formed from a panel according to the third or fourth aspects of the present invention.

Such forming may take place after coating with the material for reducing the effects of ultraviolet light and/or after decorating the film.

Suitable forming techniques include high pressure forming, which is preferred, or vacuum forming, match metal forming or the like.

Following forming, the shaped film may be subjected to further processing steps, e.g., cutting, injection molding and insert molding.

The molding process, e.g., injection molding, may be performed as either so-called single or multi-shot, e.g., two shot.

The material to be injected may comprise any suitable material, but typically this is chosen from polycarbonate, acrylonitrite-butadiene-styrene copolymer (ABS) or mixtures thereof.

The shaped member or body may be adapted to be used with or as part of an automotive vehicle, for example, a side mirror casing or housing, a bumper, at least part of a light closure or cluster (e.g., for a direction indicator or turn signal, parking light, side light headlight, foglight or reversing light), an internal light (e.g., a cabin or courtesy light) or part of any of these.

According to a sixth aspect of the present invention there is provided an apparatus having a formed member or body according to the fifth aspect.

The apparatus may be an automotive vehicle such as an automobile, lorry, truck, van, motorcycle or the like.

According to a seventh aspect of the present invention there is provided an external automotive vehicle display component wherein means are provided for reducing effects upon the component caused by exposure to ultraviolet radiation.

According to an eighth aspect of the present invention there is provided an automotive vehicle comprising an external automotive vehicle display component according to the seventh aspect of the present invention.

According to a ninth aspect of the present invention there is provided a decorative panel wherein means are provided for reducing effects upon the panel caused by exposure to ultraviolet radiation.

According to a tenth aspect of the present invention there is provided a shaped member or body formed from the panel according to the ninth aspect of the present invention.

According to an eleventh aspect of the present invention there is provided a method for manufacturing a decorative panel according to the seventh aspect of the present invention comprising the steps of:

providing a polymer film;

coating the film with a layer of material for reducing the effects of ultraviolet radiation; and     decorating the film either prior to or after coating the film.

The coated material may act as a barrier to ultraviolet light.

Preferably the coating is applied as a composition of an ultraviolet light absorbing material in a suitable carrier.

A suitable ultraviolet light absorbing material is polyvinyldifluoride.

The composition may be in the form of a liquid suspension, colloid, or solution.

Typically the composition is in the form of a solution with a solvent, and after applying the solution, the solvent is removed to provide a coating.

Any suitable solvent may be used but it has been found beneficial to use solvents with good solvency, e.g., acetone.

Any suitable coating method may be employed. It has been found that coating the film under an atmosphere of nitrogen gas has proved particularly desirable, especially when polyvinyldifluoride dissolved in acetone solvent is used as the coating material.

The film to be coated typically has a thickness of about 250 μm to about 500 μm.

The decoration may be provided by any suitable method, but ink coating is preferred for at least a part of the decorative process.

The ink is typically a high temperature resistant ink such as a polycarbonate based ink.

Any suitable printing or coating process may be used to apply the ink, although a print process such as screen printing is preferred.

The color of the ink may be chosen to match surrounding colors, or to contrast with surrounding colors. The color may also be semi-transparent or opaque to achieve the desired color effect.

Furthermore, a plurality of color layers may be provided, which may completely, or partially overlap.

The color layers may optionally be provided with a further layer thereon, e.g., a transparent laminate formed from, e.g., a polycarbonate bonded with a heat activated adhesive, e.g., polyurethane. Such further layer may mitigate possible disturbance of the color or ink layer/film in further processing steps, e.g., the melt flow of an injection molding resin.

BRIEF DESCRIPTION OF DRAWINGS

A number of embodiments of the present invention will now be described by way of example only, and with reference to the accompanying drawings which are.

DETAILED DESCRIPTION OF DRAWINGS

Figure 1:
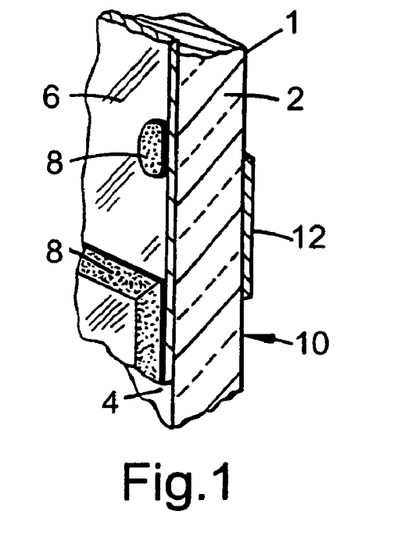
FIG. 1 a fragmentary perspective view of a portion of a panel according to the invention.

Referring initially to FIG. 1, there is illustrated a panel 1 such as an automotive vehicle component according to an embodiment of the present invention, in which a substrate layer 2 is provided which is of plastics material—in the present example a transparent poly-carbonate sheet. It will be understood that the substrate may be of any transparent material, glass or plastics and may be flexible or rigid, contoured, e.g., by a forming technique, or flat, as desired.

Applied to an obverse surface 4 of the substrate layer 2 is a layer 6 of smoky or similarly tinted material which introduces a degree of opacity to the substrate to the extent that when viewed in ambient light or daylight falling on said obverse surface 4 the panel gives a dense appearance.

The layer 6 is then provided with a layer 8 comprising a transparent coating of acrylic varnish or other suitable carrier in which is entrained a quantity of flaked mica particles which have been pre-coated with a titanium oxide pigment to give a desired color-effect by means of the light-modifying properties of mica (iridescence). In the present example, the layer 8 is discontinuous, but if preferred it may comprise a continuous coating.

Layer 8 is then provided with a coating 9 (shown in FIGS. 2 to 6) of a material to reduce the effects of exposure to ultraviolet radiation. The coating 9 is in this embodiment made substantially of polyvinyldifluoride (PVDF) to a thickness of around 25 μm.

On a reverse surface 10 of the substrate 2 is provided a discontinuous applied layer 12 of an opaque or substantially opaque pigmented ink or the like in a pre-determined pattern in the present example letters or graphics. In the present example, the pattern is applied by a screen printing technique but any suitable technique may be used, e.g., an off-set lithographic process.

Figure 2:
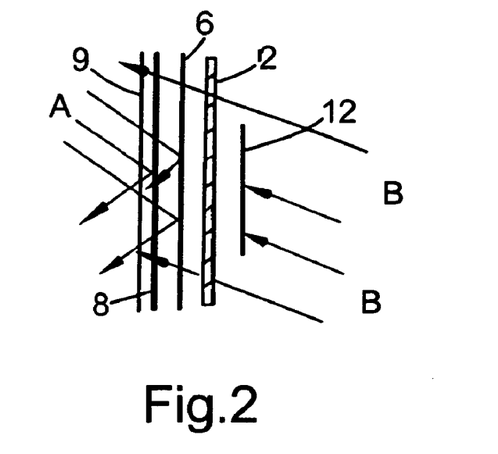
FIG. 2 an illustration of layers of the panel of FIG. 1 and a direction of light falling thereon.

The effect of light on the panel 1 of FIG. 1 is shown diagrammatically in FIG. 2.

Ambient light or daylight is shown by arrows A falling on the obverse side of the panel 1 (the left hand side in the Figures). The light reflects from the particles in the layer 8 and tends to be absorbed by layer 6 (smoked) so that the eye is aware only of the color effect of the layer 8, which is at least partially iridescent.

However, a source of illumination is provided to produce light rays (arrows B) from the rear of the panel 1 to fall on the reverse side thereof as required. These rays (B) pass through the substrate 2 and the layers 6 and 8 and are of sufficient intensity that the color effects of these layers are suppressed and indeed it is no longer possible to see the pattern or decoration afforded by the pigmented layer 8. However, some of the rays do not penetrate the layer 12 and therefore the pattern of the pigmented ink comprising the layer 12 becomes visible to the eye through the other layers.

It will be understood that in an alternative arrangement, the layer 12 may comprise one or more contrasting color hue(s) which predominate over the layer 8 when back illumination is present (rays B).

It will be understood that the layers may be in direct and intimate contact with each other or it may, if convenient, be preferred to provide a gap between any adjacent pair of layers.

FIGS. 3 to 6 show variations in the arrangements of the layers which are possible within the scope of the invention. It will be appreciated that a coating of a material to reduce the effects of exposure to ultraviolet radiation is provided on the outermost obverse surface in each arrangement.

Figure 3:
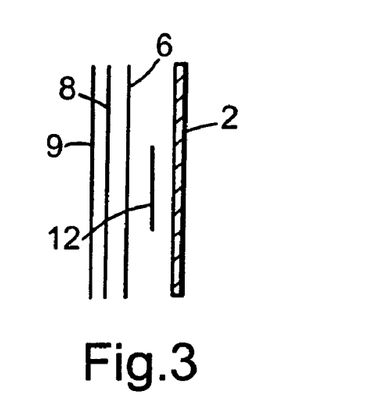
FIGS. 3 to 6 illustrations of four alternative arrangements of layers of panels according to the invention.

FIG. 3 shows an arrangement in which the layers run from left to right as follows:
(a) layer 8
(b) layer 6
(c) layer 12
(d) substrate.

Figure 4:
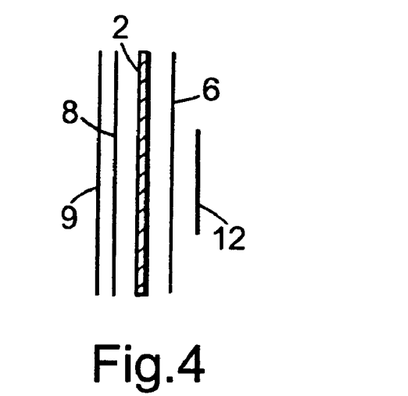

FIG. 4 has the arrangement:
(a) layer 8
(b) substrate
(c) layer 6
(d) layer 12.

Figure 5:
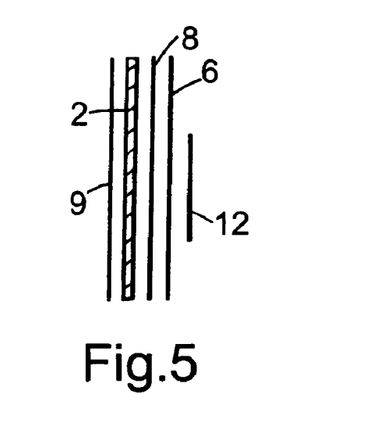

FIG. 5 has the arrangement:
(a) substrate
(b) layer 8
(c) layer 6
(d) layer 12.

Figure 6:
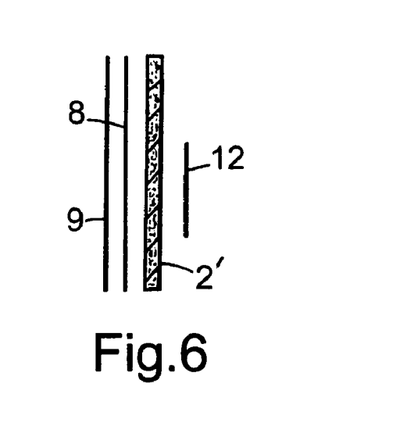

In FIG. 6, however, the layer 6 (smoked) is replaced by the provision of a smokey dye effect in the plastics material of the substrate 2' itself. Therefore the arrangement is:
(a) layer 8
(b) substrate 2' (with smokey effect)
(c) layer 12.

Figure 7:
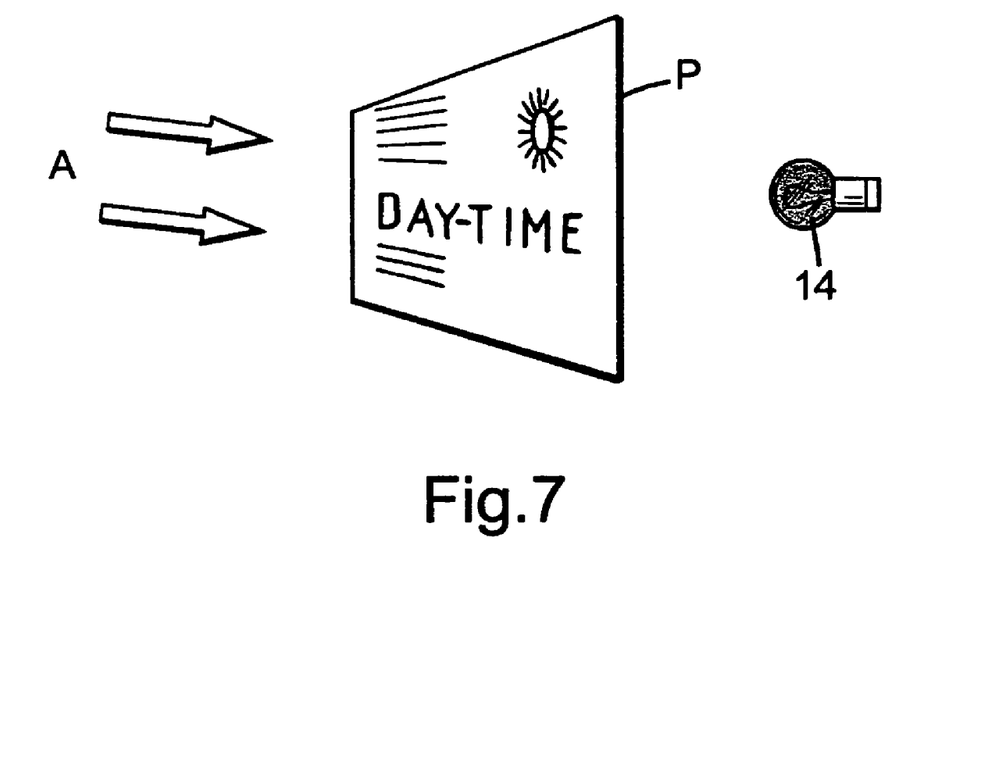
FIGS. 7, 7(a) and 8 illustrations of visible effects obtainable with the use of a panel according to the invention.
Figure 7A:
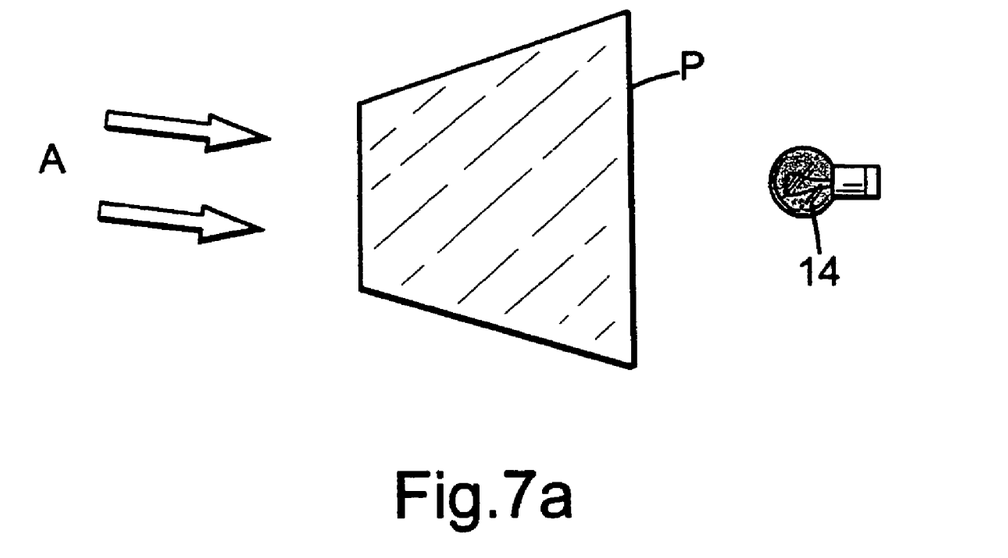
Figure 8:
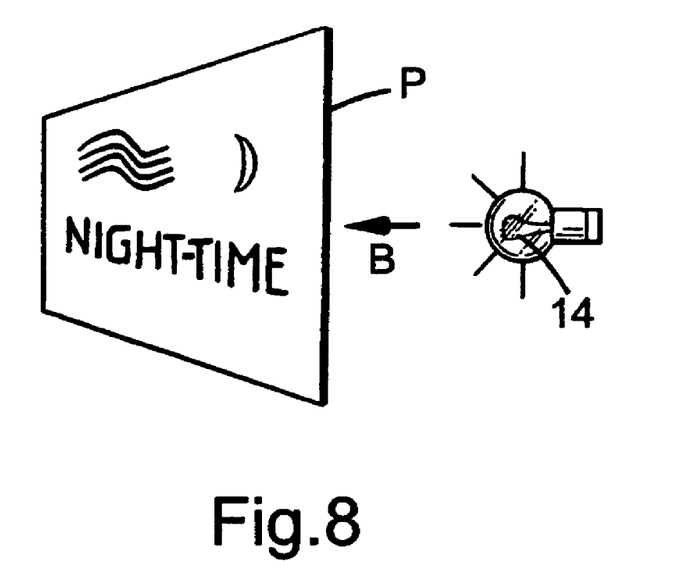

The visual effect of the use of panels according to the invention is illustrated in FIGS. 7, 7a and 8.

A panel P having layers 6, 8 and 12 arranged on a substrate as in for example FIG. 2, is viewed in natural daylight (arrows A). The presence of the discontinuous layer 8 is viewed by the eye as a representation of the sun and the words DAY-TIME.

However, if a bulb 14 is switched on and the back light level predominates, the appearance changes to that shown in FIG. 8, in which the sun and the wording has disappeared and instead the back lighting has rendered visible the pattern of the layer 12 which depicts a crescent moon and the word NIGHT-TIME.

It will be noticed that the letters T, I, M. E, are common to the wording in both lighting conditions. This is achieved in the present example by the provision of layer 8 in two sub-layers, one which covers the general area except for gaps in the shapes corresponding to the letters and another which reads "-TIME" applied on top of the first sub-layer at the appropriate position. When the light bulb 14 is illuminated, light shines through gaps provided in layer 12 in the shape of the letters "NIGHT-" and these are rendered visible, whereas the visibility of the letters "DAY-" has been diminished to the point where the eye cannot detect them.

FIG. 7a shows an alternative visual effect to the panel of FIG. 7 in that when viewed in daylight, i.e., not back-lit, the panel is seen to be of a plain color or design, with no message-shown.

In examples of panels according to the invention, it will be understood that a variety of materials may be chosen for the substrate and for the layers. Moreover, the thicknesses of the various layers may be selected as required for the purpose concerned.

For example, the thickness of the substrate layer 2 may be from, say 0.075 mm up to 10 mm or if appropriate up to 15 or 20 mm. In providing the layer, the pigmented carrier may be an acrylic varnish or a blending base, and may for instance be water-based if preferred. The size and shape of the particles is determined by that of the mica flakes from 5 to 60 μm (microns) being suitable, although flakes up to 180 μm in size may be used and may be present in the carrier varnish in the proportions 1-10%, typically 3-5%. The thickness of the layer 8 may be between 3 and 30 μm, although a range of from 6 to 15 μm may be preferred, typically 6-7 μm.

The decorative feature of the layers 8 and 12 may be purely informative, i.e., instructions or data, and may be in the form of a layer which is continuous except for shaped gaps, or comprised by "islands" of pigmented carrier.

Figure 9:
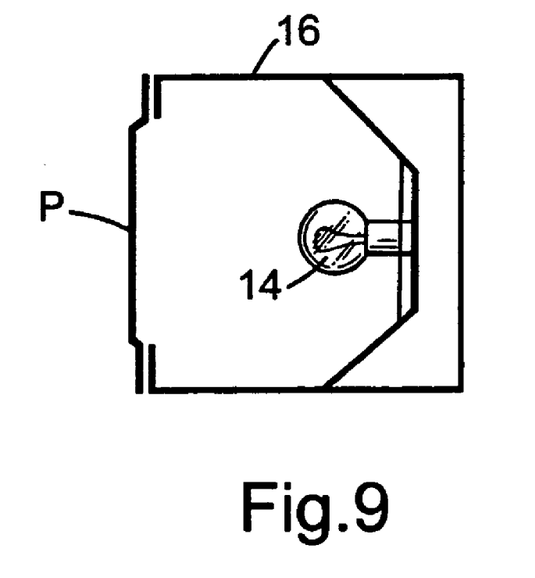
FIG. 9 a diagrammatic cross-sectional view through a panel assembly including a panel according to the invention.

FIG. 9 of the drawings illustrates a panel P as described in any of the examples given above, which has been formed so as to be contoured, i.e. not flat as in the original sheet material, and has been mounted in a support device 16, which also supports a source of illumination for example, bulb 14. It will be understood that the Figure is purely diagrammatic and can represent any suitable mounting and support means such as may, for example, be appropriate for inclusion in a vehicle side mirror, vehicle dashboard or fascia display, or alternatively in an information panel for varying data between alternative display modes, variable-appearance decorative panels for commercial, retail or similar premises, point-of-sale displays as well as for domestic and industrial appliances, instrument panels, and the like.

Figure 10:
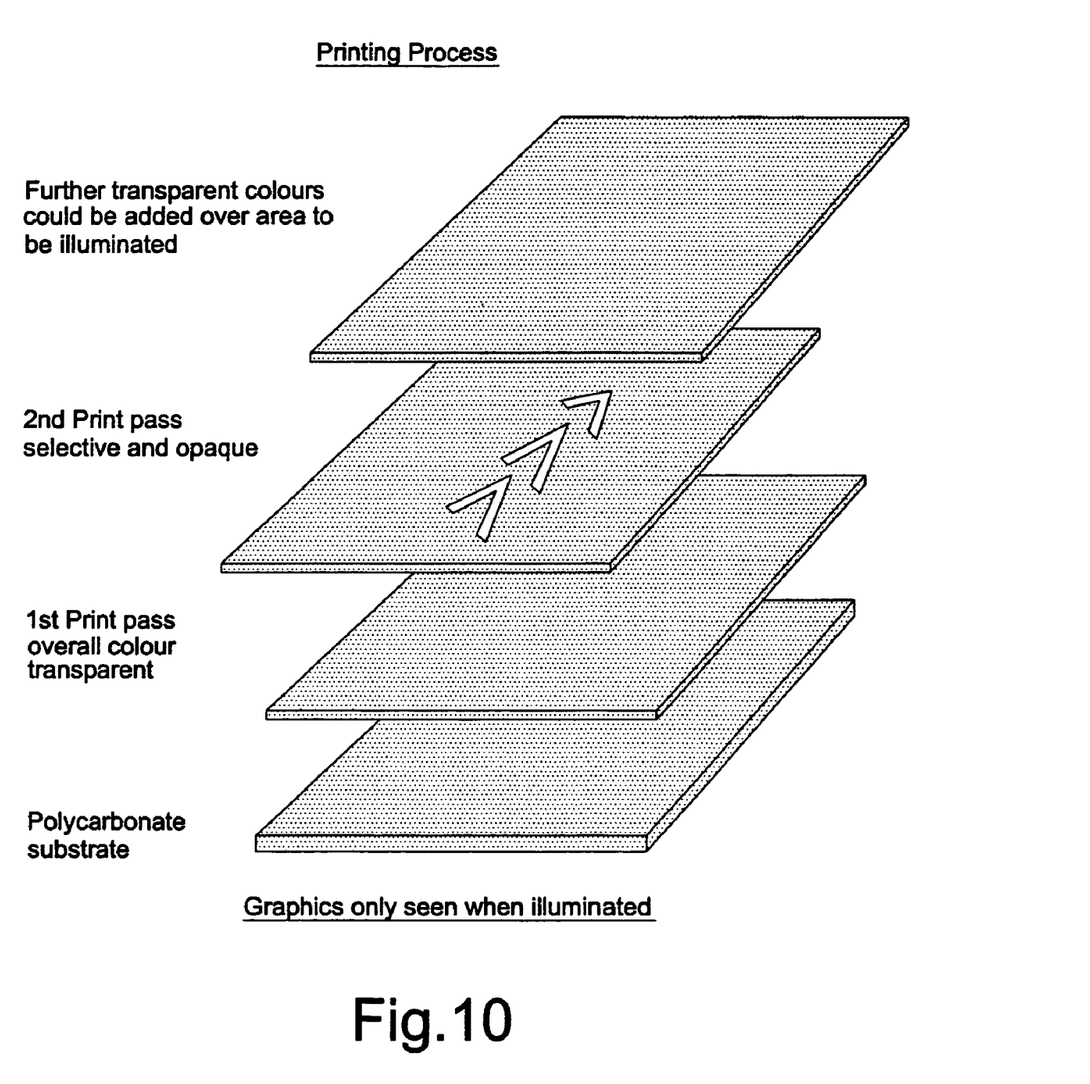
FIG. 10 a layer construction of a decorative panel according to the invention.

FIG. 10 illustrates an alternative embodiment and shows the layer constructions of a panel with print layers applied to the polycarbonate substrate. The chevron graphics are only seen when the panel is illuminated from the reverse side.

Figure 11:
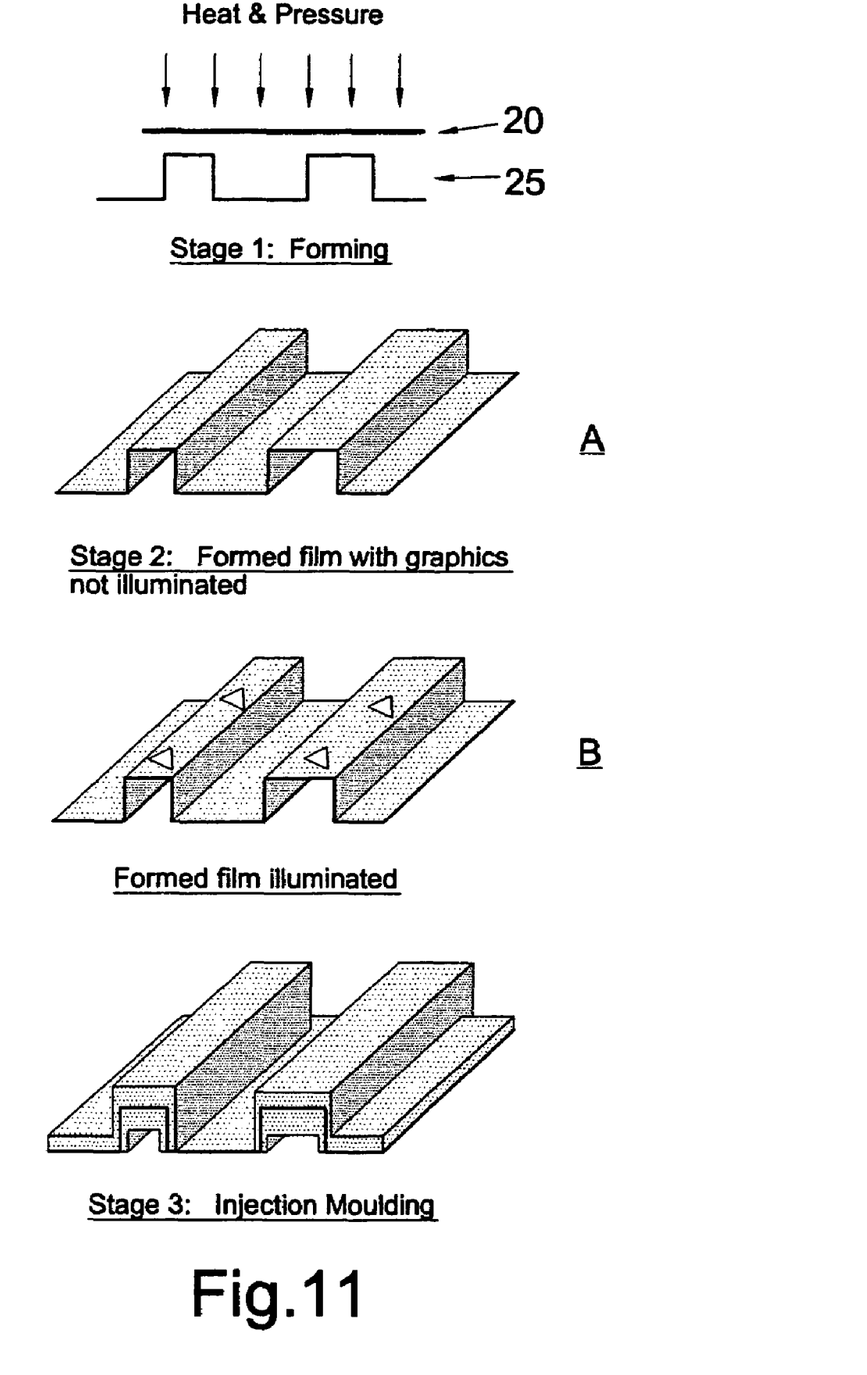
FIG. 11 a forming process for a decorative panel according to the invention.

FIG. 11 illustrates a forming process in stages 1 to 3 where heat and pressure are applied to a film 20 such as a polycarbonate film carrying printed graphics positioned above a shaped tool 25.

Stage 2 illustrates the formed film resulting from stage 1.

View A shows the appearance when the formed film is not back illuminated.

View B shows the formed film when back illuminated, and as shown a graphics pattern is revealed.

Stage 3 indicates the formed film after it has been injection molded to form a decorative panel.

Figure 12:
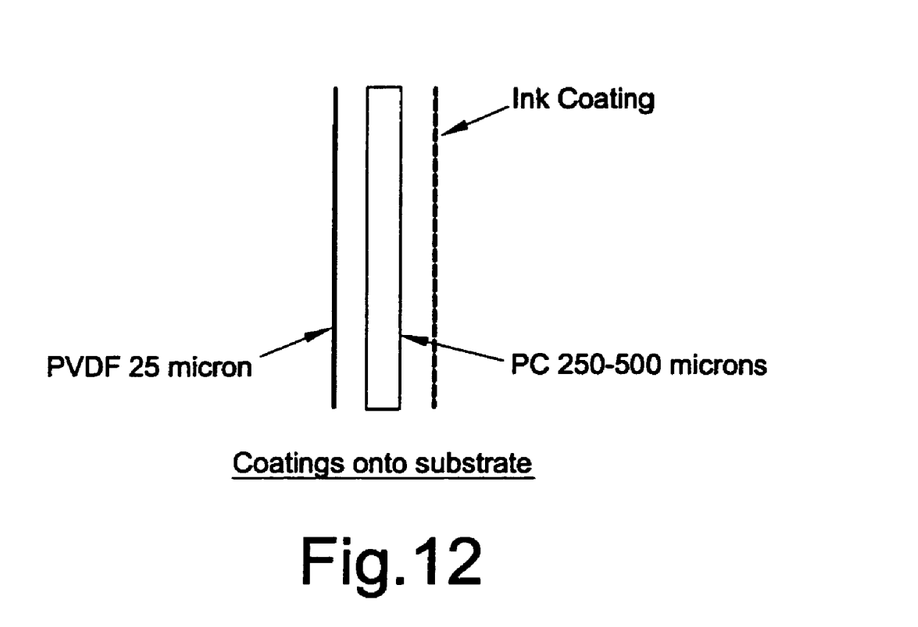
FIGS. 12, 13 and 14 various layer arrangements of decorative panels with an ultraviolet protecting coating according to the invention.
Figure 13:
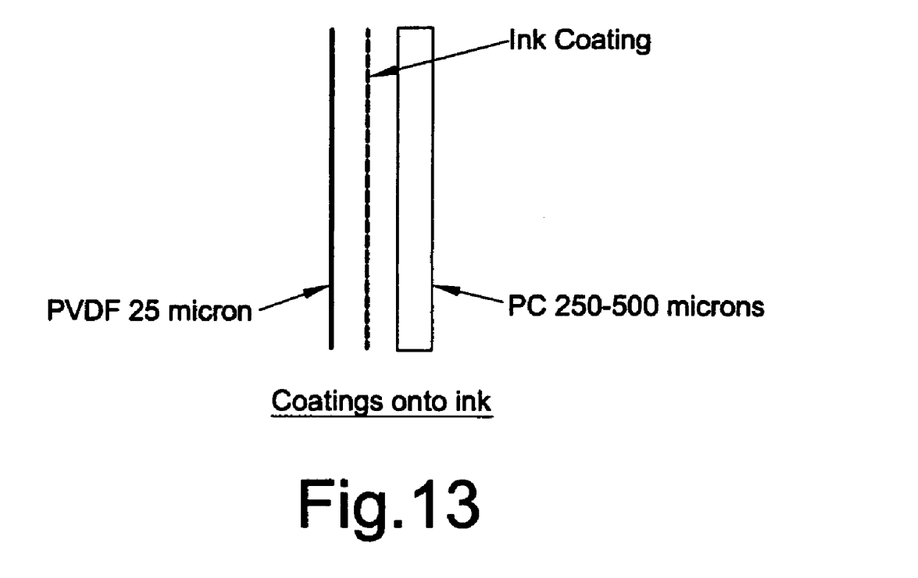
Figure 14:
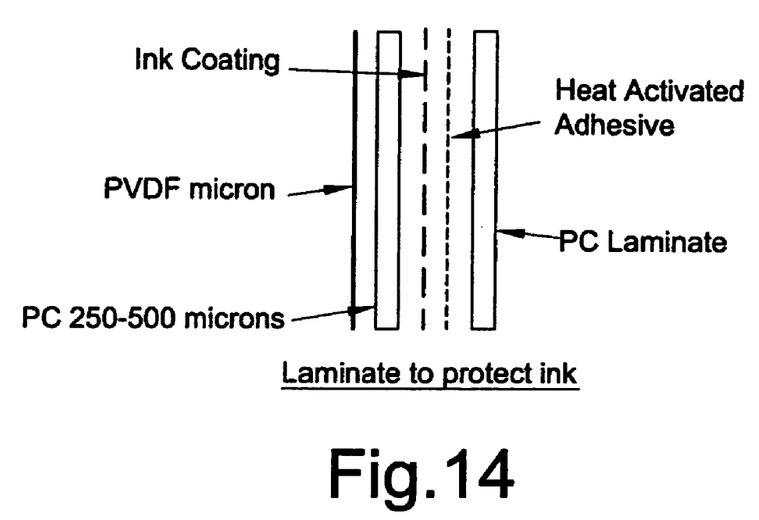

FIGS. 12, 13 and 14 illustrate three further embodiments showing various arrangements of layers of the decorative panel according to the invention.

FIG. 12 illustrates the coating of material to reduce the effects of exposure to ultraviolet radiation as a coating of polyvinyldifluoride (PVDF) of thickness 25 μm. The PVDF is coated onto a polycarbonate (PC) substrate of thickness 250-500 μm.

An ink coating, e.g., a high temperature resistant ink comprising polycarbonate, e.g., APEC polycarbonate resin available from Bayer, has been applied to the PC substrate on the side not having the PVDF coating.

FIG. 13 shows the PVDF coating applied to the ink coating.

FIG. 14 is a further modification of FIG. 12 where a polycarbonate laminate has been provided which is fixed using a heat activated adhesive.

Figure 15:
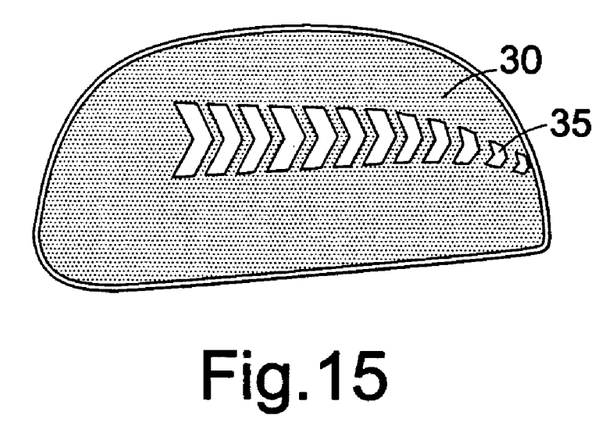
FIG. 15 a perspective view of an automotive vehicle side mirror including a decorative panel according to the invention.

FIG. 15 shows a decorative panel formed as part of a side mirror casing 30. As shown, the casing 30 can be back-illuminated to reveal a chevron graphics pattern 35 for direction indication.

Figure 16:
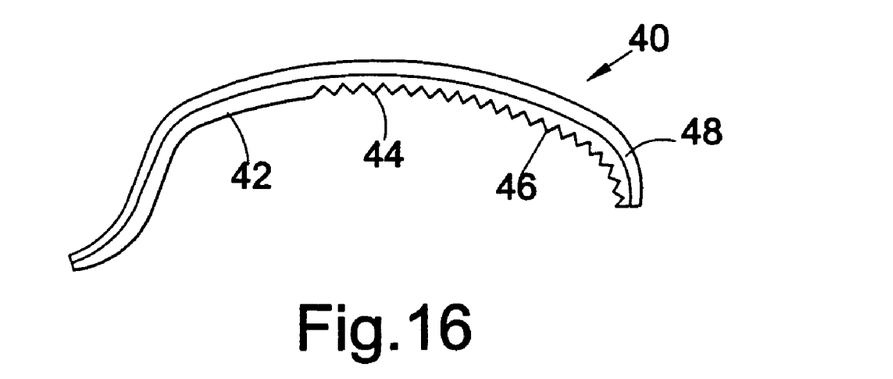
FIG. 16 a cross-sectional view in a horizontal plane of an alternative embodiment of an automotive vehicle side mirror according to the invention.
Figure 17:
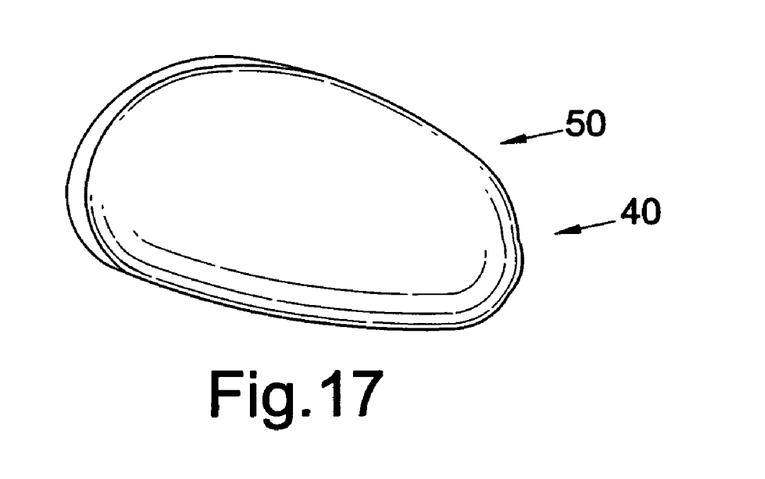
FIG. 17 a perspective view of the side mirror of FIG. 16 in an un-illuminated state.
Figure 18:
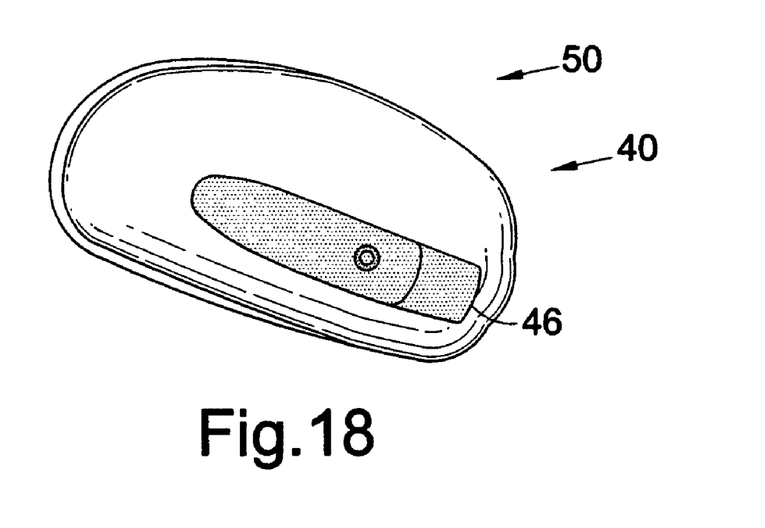
FIG. 18 a perspective view of the side mirror of FIG. 17 in an illuminated state.

Referring now to FIGS. 16 to 18 there is shown an alternative embodiment of a side mirror casing 40. In this embodiment a decorative panel 48 is formed as part of the side mirror casing 40, wherein during the process of forming, tooling applied to a rear surface of a substrate layer 42 causes a pattern to be applied or embossed to a region 46 of the substrate layer 42 so as to form a light diffusing means. In this embodiment, the embossed pattern applied to the region 46 on the rear of the substrate layer 42, provides the appearance of a conventional lens or diffuser 44 used with turn signals when the casing 40 is illuminated from a rear of the decorative panel 48. In addition, in this embodiment, the shape of the tooling produces a uniform dimpled effect when the casing 40 is illuminated. However, it will be appreciated that it is possible to provide a variety of different effects by applying a different pattern to the rear surface of the substrate layer 42, by use of alternatively shaped tooling.

In this embodiment an ink coating(s) is/are applied to the film layer which may be of a similar color to a vehicle, such as a car, to which the side mirror is to be attached. The ink is preferably polycarbonate based which ensures compatibility between the ink and substrate layer, which substrate layer may also be a polycarbonate. The use of a compatible ink also ensures that the component, in this case the side mirror, is recyclable. This is an important feature in the production of modern vehicle parts.

Referring now to FIG. 17, illustrating side mirror 50 with casing 40 when not illuminated. The side mirror 50 includes a mirror (not shown). In this configuration, the side mirror 50 appears to be of a conventional design having a sleek uniform outer surface. The casing 40 may be colored to match the color of the vehicle in order to blend with the color of the vehicle. This provides the advantage of providing a turn signal in a side mirror that does not spoil the appearance of the vehicle.

Referring now to FIG. 18, there is shown an illustration of the side mirror 50 when illuminated from behind the casing 40. In an illuminated state the side mirror 50 takes on a different appearance. A specific region 46 of the side mirror 50, i.e., diffuser 44 (FIG. 16), is transformed in order to appear like a known side mounted turn signal. Therefore, in use, when the turn signal in the side mirror 50 flashes, it alternates between the illustrations shown in FIGS. 17 and 18. The effect achieved by the flashing turn signal in the side mirror 50, provides the added advantage of providing a turn signal with a high visual impact which will be clearly visible and attract the attention of pedestrians and other road users.

It will be appreciated that this embodiment details how direction indicators may be incorporated in side mirrors. However, this technique may be applied to other portions of a vehicle, such as the light units or clusters located at the front, rear or side of a vehicle; decorative strips on the side of a vehicle; or for a strip to illuminate a running board or the like of an automotive vehicle. It will also be understood that for a light cluster, different patterns may be embossed into the substrate for each of the lights in the cluster.

It will further be appreciated that the embodiments described hereinbefore are illustrative of the present invention only, and are not to be considered limiting thereof.

Particularly it will be appreciated that to provide the panel with sufficient rigidity the panel may be molded ("in-molded") to a rigid backing member, e.g., a transparent or translucent member of a same or compatible material, e.g., polycarbonate.

That which is claimed:

1. A panel having an obverse side and a reverse side, the panel comprising a substrate of plastics material and an ink layer, wherein, in use, when viewed from the obverse side the panel has a first opaque appearance when not illuminated from the reverse side, but at least part of the panel has a second transparent or translucent appearance when illuminated from the reverse side, and further wherein means are provided for reducing effects upon the panel caused by exposure to ultraviolet radiation, and the substrate comprises a polycarbonate material and the ink layer comprises a polycarbonate based ink.

2. A panel as claimed in claim 1, wherein the means for reducing ultraviolet radiation effects comprises polyvinyldifluoride (PVDF) or a material based thereon.

3. A panel as claimed in claim 1, wherein the panel is a decorative panel.

4. A panel assembly adapted to provide a variable visual appearance to a decorative panel constructed in accordance with claim 1, said assembly comprising a support device mounting said panel, and a source of light positioned behind the reverse surface of the panel and adapted to provide light arranged to pass through the panel wherever an opacity thereof permits.

5. A panel as claimed in claim 1, wherein the means for reducing the effects of ultraviolet light exposure is provided in the form of a coating.

6. A panel as claimed in claim 5, wherein the coating is applied to at least a portion of the panel.

7. A panel as claimed in claim 5, wherein the coating has a thickness of at least 25 µm.

8. A panel as claimed in claim 1, wherein the panel is made from a polymer material comprising a transparent or translucent polymer film.

9. A panel as claimed in claim 8, wherein the polymer film is selected from one of polycarbonate, acrylic, polyester or other thermoplastic material.

10. A panel as claimed in claim 8, wherein the thickness of the polymer film is about 250 µm to about 500 µm.

11. A panel as claimed in claim 1, wherein the panel comprises a plurality of ink layers, including a first at least partially transparent layer, and a second layer, at least selected areas of said second layer having a degree of contrast in opacity or colour, said first and second layers being associated with the substrate comprising a substrate layer having an obverse surface and a reverse surface, wherein means are provided for furnishing said substrate layer with a partially transparent tinted appearance, wherein said first layer comprises a coating comprising a transparent carrier in which are supported non-opaque particulate light-splitting or light-frequency modifying materials, said materials being capable of causing light-splitting effects when viewed in light falling in the direction of the obverse surface of said substrate layer, and wherein said second layer provides said at least selected areas rearwardly of said first layer which are of predetermined size and shape, the construction and arrangement being such that the light-splitting or modifying effect caused by said particulate material in said first layer and visible in ambient light is suppressed by the passage of light from a source located at the reverse side of the panel so that the presence of said at least selected areas become visible from the obverse side of the panel.

12. A panel as claimed in claim 11, wherein the second layer is colour tinted in a contrasting hue so that the colour tint is visible only on the passage of light from a source located at a reverse side of the panel.

13. A panel as claimed in claim 11, wherein the visual effect of the presence of the pigment is varied according to the thickness of the pre-coating.

14. A panel as claimed in claim 13, wherein variations of the pigment can be observed in accordance with the base colour of the substrate layer and the degree of translucency thereof.

15. A panel as claimed in claim 11, wherein the second layer is provided as graphics in the form of information symbols applied in a discontinuous layer of an opaque or substantially opaque pigment.

16. A panel as claimed in claim 15, wherein the pigmented material is printed pigmented ink.

17. A shaped or moulded member or body formed from a panel according to claim 1.

18. A shaped member as claimed in claim 17, wherein forming takes place after coating with the material for reducing the effects of ultraviolet light and/or after decorating the panel.

19. A shaped member as claimed in claim 17, wherein a forming technique is selected from high pressure forming, vacuum forming and match metal forming.

20. A shaped member as claimed in claim 17, wherein the shaped member is adapted to be used with or as part of an automotive vehicle selected from: a wing mirror casing, a bumper, a light closure or cluster for a direction indicator, side light, headlight, foglight, or internal cabin or courtesy light or part of any of such.

21. An apparatus having a shaped or formed member or body according to claim 17.

22. An apparatus as claimed in claim 21, wherein the apparatus is an automotive vehicle.

23. A shaped member as claimed in claim 17, wherein following forming the shaped panel is subjected to further processing steps selected from one and more of: cutting, injection moulding and insert moulding.

24. A shaped member as claimed in claim 23, wherein the moulding process is performed as either single or multi-shot.

25. A shaped member as claimed in claim 23, wherein the material to be injected comprises a material selected from polycarbonate, acrylonitrite-butadienestyrene co-polymer (ABS) and mixtures thereof.

26. A panel as claimed in claim 1, wherein the coating is applied to at least part of an outermost surface of the panel comprising a surface of the obverse side.

27. A panel as claimed in claim 26, wherein the ink layer comprises first a layer comprising an at least substantially transparent carrier containing particulate semi-transparent colour producing material.

28. A panel as claimed in claim 27, wherein the colour producing material is flaked iridescent material.

29. A panel as claimed in claim 28, wherein the flakes of the flaked iridescent material are provided with a pre-coating of ultra-thin layers of pigment comprising oxides of metals.

30. A panel according to claim 1, wherein the panel is a decorative panel comprising a substrate layer comprising the substrate and a coating layer comprising the at least one ink layer, the coating layer being applied to an obverse surface of the substrate layer, said coating layer comprising non-opaque particulate light-frequency modifying materials entrained in a carrier therefore, said particulate materials being capable of causing light splitting effects when viewed in light falling upon the coated obverse surface, wherein said substrate layer is non-opaque except where provided with a layer comprising opaque or substantially opaque areas which are of predetermined size and shape, the construction and arrangement being such that the light-splitting or modifying effect caused by the particulate material and visible in ambient light is suppressed by the passage of light from a source located at the reverse side of the panel so that the presence of the opaque areas become visible from the obverse side of the panel, the panel further comprising the means for reducing effects upon the panel caused by exposure to ultraviolet radiation.

31. A panel as claimed in claim 30, wherein the coating layer is provided by coating the substrate layer with a layer including ultra-thin flakes of mica that have been precoated with titanium dioxide.

32. A panel as claimed in claim 31, wherein the coated flakes are capable of splitting light into visible component colours, an apparent colour depending upon the thickness of the titanium dioxide layer on the mica.

33. A panel as claimed in claim 32, wherein a thickness of the titanium dioxide layer varies from 40 to 160 nm giving a range of colour from silver-white through copper-red, lilac, vivid blue, turquoise and green.

34. A panel as claimed in claim 31, wherein colour changes are seen according to an angle from which the coated mica flakes are observed, interference colour being visible only at a glancing angle.

35. A panel as claimed in claim 34, wherein colours seen at other angles differ.

36. A panel as claimed in claim 30, wherein the panel comprises a partially transparent panel substrate which is smoke-coloured.

37. A panel as claimed in claim 36, wherein the colour is imparted to the panel in a third layer which is applied by a printing technique.

38. A panel as claimed in claim 36, wherein the colour is obtained by the inclusion of pigment in a plastics film or other material of the panel substrate.

39. A panel as claimed in claim 38, wherein the visual effects are obtained with the use of pigments of a relatively dark hue.

40. A panel as claimed in claim 39, wherein the positioning of a light source behind the panel allows light from that source to penetrate the panel and the pigmented coating of the first layer.

41. An automotive vehicle component comprising a panel, the panel having an obverse side and a reverse side, the panel comprising a substrate of plastics material and at least one ink layer, wherein, in use, when viewed from the obverse side the panel has a first opaque appearance when not illuminated from the reverse side, and at least part of the panel has a second transparent or translucent appearance when illuminated from the reverse side, and wherein means are provided for reducing effects upon at least a portion of the panel caused by exposure to ultraviolet radiation, and wherein the substrate comprises a polycarbonate material and the at least one ink layer comprises a polycarbonate based ink.

42. An automotive vehicle component as claimed in claim 41, wherein the ultraviolet reducing means comprises polyvinyldifluoride (PVDF) or a material based thereon.

43. An automotive vehicle component as claimed in claim 41, wherein the substrate and the at least one ink layer are each made from substantially the same or compatible materials.

44. An automotive vehicle component as claim in claim 41, wherein the automotive component is adapted to comprise at least part of an external automotive vehicle component, and the panel comprises a formed panel.

45. An automotive vehicle component as claimed in claim 41, wherein the component comprises at least a part of one of a wing mirror, a bumper, and a light closure or cluster.

46. An automotive vehicle component as claimed in claim 41, wherein the panel comprises the substrate in the form of a substrate layer, the at least one ink layer and an ultraviolet reducing layer.

47. An automotive vehicle component as claimed in claim 41, wherein the substrate layer provides a light diffusing means.

48. An automotive vehicle component as claimed in claim 41, wherein the ultra-violet reducing means comprises polyvinyldifluoride (PVDF) or a material based thereon.

49. A three-dimensional formed panel adapted for use in the automotive vehicle component of claim 41.

50. An external automotive vehicle display component comprising an automotive vehicle component according to claim 41, wherein the panel comprises a formed panel.

51. An automotive vehicle comprising an external automotive vehicle display component according to claim 50.

52. A method for manufacturing a panel or decorative panel according to claim 41, the method comprising the steps of:
    providing the substrate comprising a polymer film;
    coating the polymer film with a layer of material for reducing the effects of ultraviolet radiation; and
    decorating the polymer film either prior to, or after coating the film, wherein the coating material acts as a barrier to ultraviolet light.

53. A method as claimed in claim 52, wherein the polymer film is coated under an atmosphere of nitrogen gas and wherein the coating material is polyvinyldifluoride dissolved in acetone solvent.

54. A method as claimed in claim 52, wherein the polymer film has a thickness of 250 μm to 500 μm.

55. A method as claimed in claim 52, wherein a plurality of colour ink layers are provided which completely or partially overlap.

56. A method as claimed in claim 55, wherein the colour ink layers are optionally provided with a further layer thereon, such as a transparent laminate formed from a polycarbonate bonded with a heat activated adhesive, such as polyurethane.

57. A method as claimed in claim 56, wherein the further layer mitigates disturbance of the at least one ink layer/film in further processing steps, including melt flow of an injection moulding resin.

58. A method as claim in claim 52, wherein the coating is applied as a composition of an ultraviolet light absorbing material in a carrier.

59. A method as claimed in claim 58, wherein the ultraviolet light absorbing material is polyvinyl-difluoride (PVDF).

60. A method as claimed in claim 58, wherein the composition is in the form of a liquid suspension, colloid, or solution.

61. A method as claimed in claim 58, wherein the composition is in the form of a solution with a solvent, and after applying the solution, the solvent is removed to provide the coating.

62. A method as claimed in claim 61, wherein the solvent used is acetone.

63. A method as claimed in claim 52, wherein the decoration is provided by coating at least a part of the panel with the ink layer.

64. A method as claimed in claim 63, wherein ink of the ink layer is a high temperature resistant ink comprising polycarbonate.

65. A method as claimed in claim 63, wherein the ink is applied by a print process comprising screen printing.

66. A method as claimed in claim 63, wherein the colour of the ink is chosen to match surrounding colours or to contrast with surrounding colours.

67. A method of claim 66, wherein the colour is semi-transparent or opaque to achieve a desired colour effect.

* * * * *